United States Patent [19]
Bloom

[11] 3,819,230
[45] June 25, 1974

[54] CHILD'S SAFETY SEAT

[75] Inventor: Milton W. Bloom, Toronto, Ontario, Canada

[73] Assignee: Donlee Manufacturing Industries Limited, Toronto, Ontario, Canada

[22] Filed: Jan. 15, 1973

[21] Appl. No.: 323,887

[52] U.S. Cl. ............................... 297/250, 297/390
[51] Int. Cl. ............................................. A47c 1/08
[58] Field of Search .................... 297/250, 390, 385

[56] References Cited
UNITED STATES PATENTS

| | | | |
|---|---|---|---|
| 3,232,665 | 2/1966 | Von Wimmersperg | 297/385 |
| 3,335,434 | 8/1967 | Gamon | 297/250 UX |
| 3,424,497 | 1/1969 | Brilmyer et al. | 297/390 |
| 3,596,986 | 8/1971 | Bagsdale | 297/250 |
| 3,606,457 | 9/1971 | Reay | 297/390 |

Primary Examiner—James C. Mitchell

[57] ABSTRACT

A child's auto safety seat comprising a generally U-shaped portion having a base and a pair of opposed side walls extending upwardly from the said base and spaced apart sufficiently to enable the users lower body to be seated on said base and the users legs to extend through the space defined by the side walls, a transverse wall member formed of or supporting an energy absorptive material joined integrally to the side walls at an upper portion of said side walls for restraining the user's upper body, and an opening formed in each side wall at a level above the center of gravity of the seat for receiving a safety seat belt for securing the safety seat against a vehicle seat and the vehicle seat backrest.

3 Claims, 3 Drawing Figures

CHILD'S SAFETY SEAT

BACKGROUND OF THE INVENTION

This invention relates to safety seats and in particular relates to safety seats for children for use in combination with vehicle seats such as seats found in automobiles, trucks and the like, having a rigid back and a safety belt.

Safety seats for children are well known and many versions are available to the public; however, known safety seats generally suffer from the inherent problem of failing to provide adequate protection for the child's upper body and head upon absrupt reduction of the vehicle speed such as in an accident. Many safety seats attempt to render protection to the child's upper body by providing a frontal restraining means such as a crossbar across the front of the seat; however, this provision does not protect the child's head. It has been found that during an accident, the child's head is thrown forward violently and this phenomenon commonly referred to as head excursion, can cause serious injury to the child.

Many safety seats with a frontal restraining crossbar are constructed such that the cross-bar must be structurally strong enough to withstand the increased force of momentum impinged upon it via a child's body. This structure cannot absorb any impact energy, however, and during an accident, the child's body is urged against the solid frontal restraining means with impact energy entirely absorbed by the child's body.

Conventional safety seats also fail to provide an adequate lateral support for a child upon side-swiping or lateral impacts, so that during such occurrence, the child's body is tossed sideways within the seat to collide with other objects in the vehicle or even with the vehicle door. Frequently the child is simply tossed out of the safety seat through its side by the lateral impact.

Furthermore, known safety seats are not stably secured in the vehicle. The safety seats conventionally have an arch-shaped mounting bracket for either hanging the seats on the backrest of the vehicle seat or for embracing the seat portion of the vehicle seat. Therefore, a safety seat often is not fixedly secured in the vehicle and, during an accident, it is easily thrown out of the vehicle seat.

SUMMARY OF THE INVENTION

I have invented a safety seat which obviates the foregoing problems inherent in conventional safety seats by providing a unitary structure which substantially envelopes the child's entire body and supports the child's back against the backrest of the vehicle seat. An energy absorptive frontal restraining wall is provided to limit head excursion and to absorb impact energy. The safety seat according to the present invention is fixedly secured in the vehicle seat by the safety seat belt provided therein.

It is a principal object of the present invention, therefore, to provide a child's safety seat which is structurally sound for supporting the weight of a child and for absorbing the load and stresses imposed thereon during impact of the vehicle.

It is another object of the present invention to provide a safety seat adaptable universally for use in combination with any vehicle seat which has a rigid or lockable backrest.

And another important object of the present invention is the provision of a child's safety seat which will provide improved restraint and protection to the child in head-on and lateral collisions and upsets.

In accordance with the present invention, the safety seat comprising a generally U-shaped portion having a base and a pair of opposed side walls extending upwardly from the said base and spaced apart sufficiently to enable the users lower body to be seated on said base and the users legs to extend through the space defined by the side walls, a transverse wall member joined integrally to the side walls at an upper portion of said side walls for restraining the user's upper body, and an opening formed in each side wall at a level above the center of gravity of the seat for receiving a safety seat belt therethrough for securing the safety seat against the vehicle seat and the vehicle seat backrest.

More specifically, the safety seat of the present invention is securable in a vehicle by safety seat belts provided in the vehicle and suitable for use in protecting a child seated therein, comprising a unitary chair structure having a substantially rectangular seat member, two opposed upright side walls formed integrally with said seat member adapted to support and protect the sides of the child, the upright side walls including a substantially high triangular forward portion having an upper edge sloping upwardly and forwardly, a D-shaped opening formed in each of the triangular forward portions of the said side walls for receiving the seat belt therethrough to secure the safety seat in the vehicle, each said opening having a substantially C-shaped rearward side, and a transverse wall member having a substantially C-shaped cross-section connected to and extending between the rear edges of the said triangular portions of the side walls, adjoining the C-shaped sides of the openings, and each said opening having a substantial straight forward edge defining a vertical post for providing rigidity and strength in the safety seat.

BRIEF DESCRIPTION OF THE DRAWINGS

These and other objects of the present invention and the manner in which they can be attained will become apparent from the following detailed description of the drawings, in which.

DESCRIPTION OF THE PREFERRED EMBODIMENTS

With reference now to the drawings, the safety seat of the present invention comprises a unitary chair having a hollow wall structure which may be fabricated conveniently by rotational casting or moulding with a high-density and structurally strong plastic such as high-density polyethylene. The hollow wall structure provides a resilience to the wall such that it is slightly deflectable under stresses to absorb any impact energy.

Figure 1:
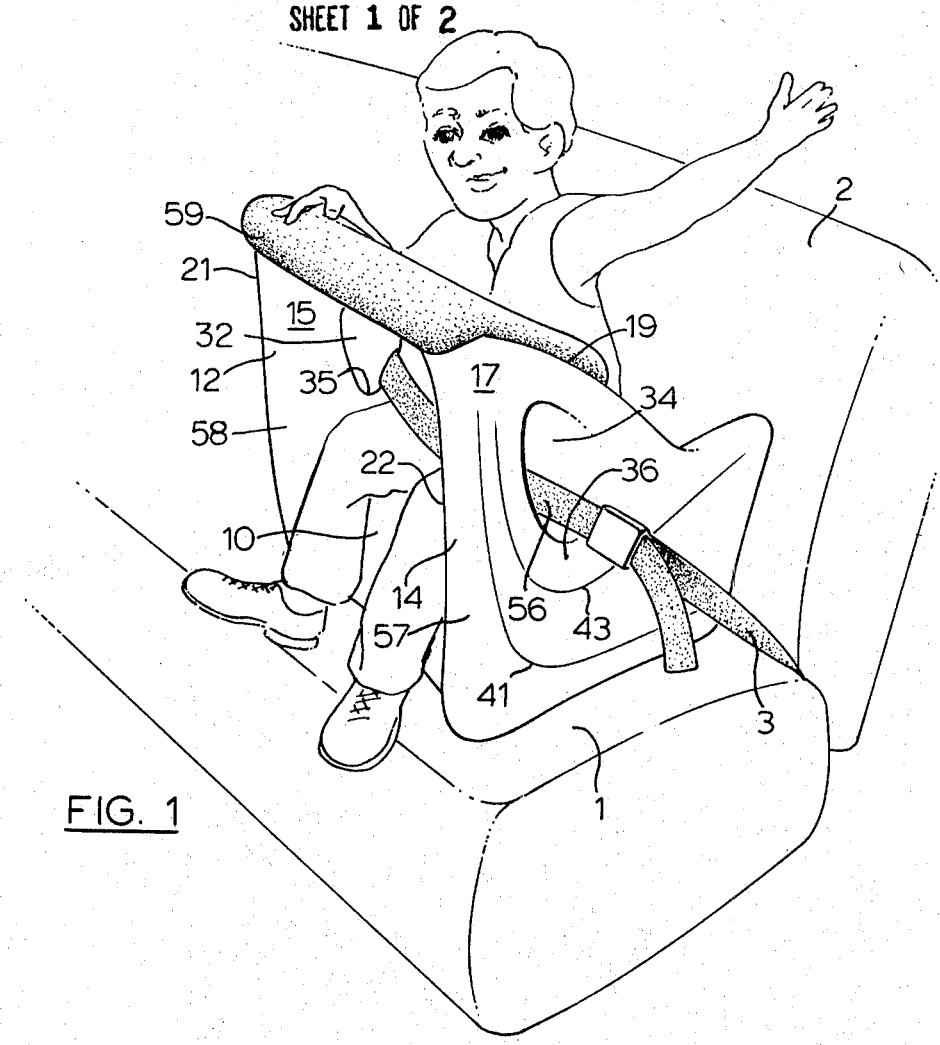
FIG. 1 is a perspective view of the child's safety seat of the present invention in its operative position secured to a vehicle seat by means of a safety seat belt.

The safety seat comprises a base seat member 10 and two opposed upright side walls 12 and 14 formed integral therewith and depending upwardly therefrom to define a cavity designated generally by the numeral 16. The cavity 16 is intended to receive the lower portion of the child's body and to permit extension of the child's legs therethrough when the seat is in its operative position as shown in FIG. 1. In this operative position, the safety seat is secured to a car seat 1 having a backrest 2 by means of a safety seat belt 3. The back of the child is protected by the relatively high backrest 2 of the car seat and the child's head is protected from backward excursion by the resilient backrest.

The upright side walls 12 and 14 include a substantially triangular forward portion generally shown as 15 and 17 having upper edges 19 and 20 respectively sloping upwardly and forwardly to adjoin the substantially vertical back edges 21 and 22. The upright side walls provide a lateral retraint for the torso of the child held within the seat, yet permits the child the freedom of movement therein. The upright side walls extend to a height about the middle portion of the child's torso, so that they normally serve as arm rests for the child. During upset of the vehicle, these high side walls provide protection to the child's body from lateral movement, so that the child will not be tossed out of the seat through the sides. Also, the upright side walls, due to their hollow wall structure, will resiliently deflect slightly to absorb impact energy, thus reducing the impact energy impinging on the child.

Two substantially D-shaped openings 32 and 34 are respectively provided in the triangular forward portions 15 and 17 of the side walls above the centre of gravity of the seat. These openings are in registry with each other such that the safety seat belt in the vehicle passes through the openings to fasten the safety seat on the vehicle seat, as shown in FIG. 1. Since the safety seat belt is fixedly anchored to the vehicle, the safety seat is stably mounted therein. The bottom edges 35 and 36 of the D-shaped openings are formed transverse to the shorter diagonal of the side walls so that the safety seat belt 3 exerts a force perpendicular the bottom edges to hold the safety seat downwards firmly against the car seat 1 as well as firmly against the backrest 2.

The frontal transverse restraining wall member 37 having a substantially C-shaped cross-section corresponding to the C-shape portion of the rear edge of each of the D-shaped openings is formed integrally with and extends between the triangular rear portions of the side walls 12 and 14. The upper surface of the upper portion of the restraining wall member 37 is co-planar with the sloping upper edges of the side walls, while its bottom surface adjoins the curved edges of the C-shaped portion of openings 32 and 34 and extends therebetween. The frontal restraining wall member 37 provides a restraint for the child's upper front torso and the head excursion of the child is effectively prevented by the upper portion thereof.

The substantially straight forward edges 55,56 define in part vertical posts 57,58 which secure and support the forward portion 59 of wall member 37 to the sides of base member 10.

The safety seat belt which secures the safety seat on the vehicle seat is not in contact with the child's body and is spatially separated from the frontal restraining wall member 37, so that any impact energy transmitted to the safety seat belt is largely absorbed by the frontal restraining wall hollow structure. A crash pad 39 is detachably secured to the front restraining wall member 37 by fastening means such as clip-on buttons 28 and 30. The crash pad may be fabricated of an energy absorptive material such as a sheet material having resilient characteristics or a spongy sheet material, so that when the child's head is pressed against the frontal restraining wall member, which limits the head excursion, the impact energy is absorbed by both the slightly resilient frontal restraining wall member and the resilient crash pad.

The frontal restraining wall member 37 is structurally strong due to its C-shaped cross-section and the extra support of its upper portion by the pillar-like ports 57,58 formed between the rear edges of the D-shaped openings and the front edges 21 and 22 of the safety seat. During an accident, any impact energy that is not absorbed by the frontal restraining wall member and by the crash pad is transmitted through the posts to the bottom edges of the safety seat and, due to the hollow side wall structure, the bottom edges will resiliently bulge out under the force. This resilient bulging action will help to absorb some of the impact energy and tend to anchor the safety seat more firmly and stably on the vehicle seat while some of the impact energy is also absorbed by the resilient vehicle seat.

The pillar-like posts also advantageously serve as handles for easy carrying of the safety seat.

Reinforcing ridges 40 and 41 are provided near the back edge and bottom edge of each side wall to reinforce these edges against any stresses, particularly bending stresses. Similar reinforcing ridges 42 and 43 are also provided around the edges of the D-shaped openings and the rear corners of the side wall.

The top surface of the seat member 10 is resiliently flexible due to the hollow wall structure of the seat so as to absorb any vertical forces impinging thereon. A cushion or pad made of energy absorptive resilient material may be placed on the seat member to increase the impact energy absorption property therein. Cushions of various thicknesses may be used to adjust the height of the sheet member according to the physical size of the child so that the child is seated properly within the seat and the cushion will prevent a child with a small body for slipping out of the rectangular opening 47 bounded by the bottom edge of the frontal restraining wall member and the side walls, through which the child's legs are extended.

Figure 2:
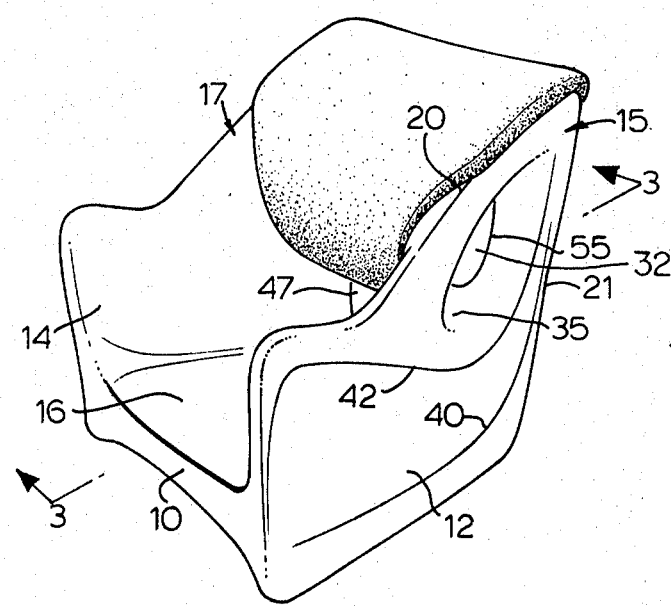
FIG. 2 is a perspective view of the seat of the present invention shown in FIG. 1 from the opposite side, said seat being detached from the vehicle seat.
Figure 3:
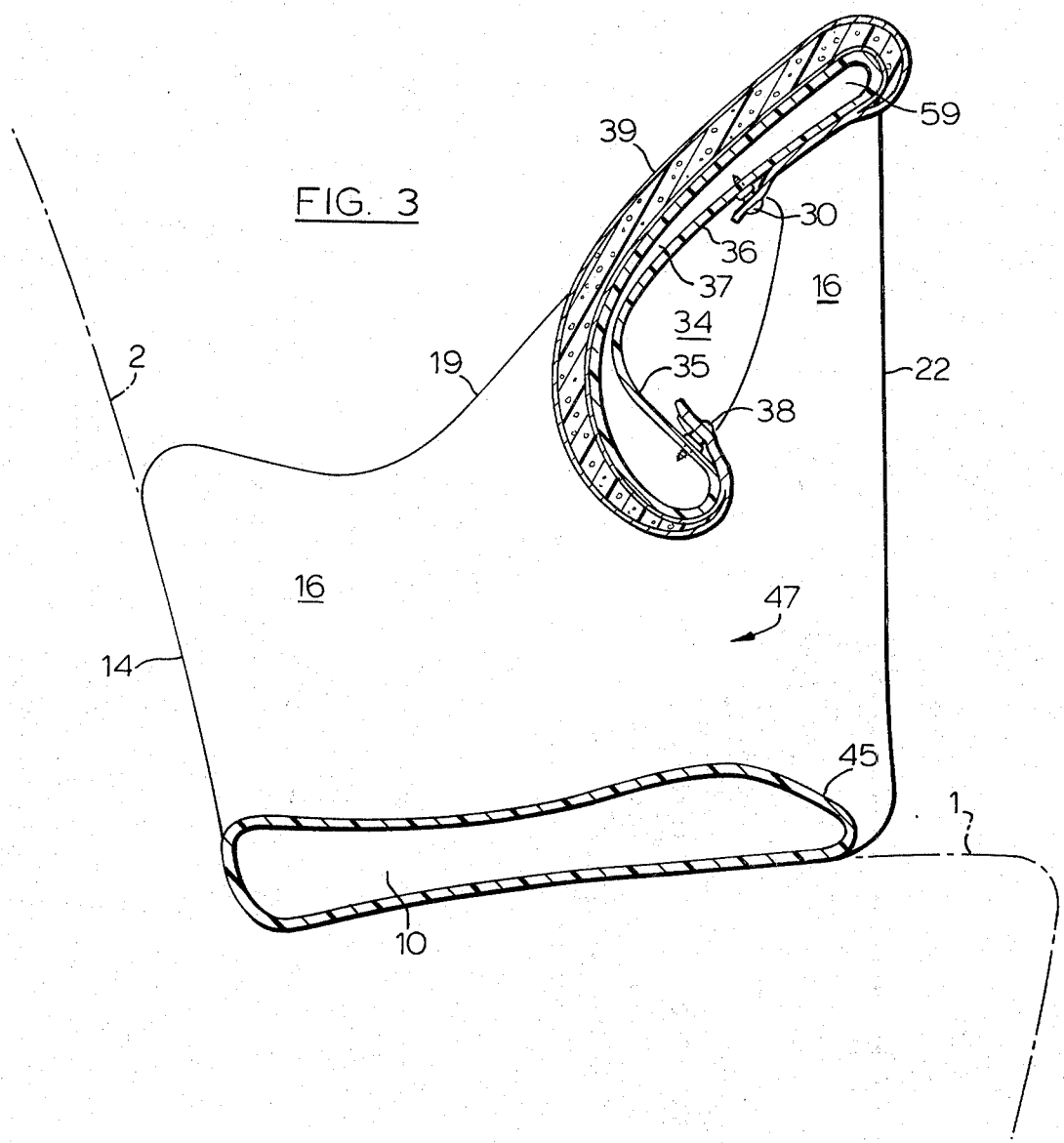
FIG. 3 is a section taken through line 3—3 of FIG. 2 showing in some detail the structural configuration of the seat and the securement thereto of a crash pad.

The bottom surface of the base seat member 10 is slightly concave in the transverse direction as best shown in FIG. 2 of the drawings, so that the safety seat is stably anchored on the vehicle seat. When the vehicle is subjected to a lateral impact, the lateral impact energy which normally tends to topple the safety seat is substantially eliminated by this concave bottom surface structure, and the lateral movement of the child is protected by the high upright side walls.

It can be appreciated that the safety seat is structurally strong because of its unitary structure which provides a full protection for the child against impact from all directions and that the child's body is fully separated from contact with any non-energy absorptive articles in the vehicle.

While the invention has been particularly shown and described with reference to the preferred embodiment thereof, it will be understood by those skilled in the art that various changes in form and detail may be made therein without departing from the spirit and scope of the invention.

What we claim as new and desire to protect by Letters Patent of the United States is:

1. A safety seat for use in a vehicle having a seat with a rigid backrest and seat belts affixed to said vehicle comprising, in combination, a unitary chair structure having a substantially rectangular base forming a seat member, two opposed upright side walls formed integrally with said seat member adapted to support and protect the sides of the child, the upright side walls including a substantially high triangular forward portion having an upper edge sloping upwardly and forwardly, a D-shaped opening formed in each of the triangular forward portions of the said side walls for receiving the seat belt therethrough to secure the safety seat in the vehicle, each said opening having a substantially C-shaped rearward side, and a transverse wall member having a substantially C-shaped cross-section connected to and extending between the rear edges of the said triangular portions of the side walls adjoining the C-shaped sides of the openings, each said opening having a substantially straight forward edge defining a vertical post for providing ridigity and strength in the safety seat, and said base, opposed upright sidewalls and transverse wall each having a hollow core and formed of a plastic material having the characteristics of high-density polyethylene for imparting resilience thereto.

2. A safety seat as claimed in claim 1, said base having a concave bottom surface.

3. In a safety seat as claimed in claim 2, said side walls and said posts having linear ridges formed externally thereon for increasing the rigidity of the post and facilitating flexure of said sidewalls for absorbing impact stresses.

* * * * *